United States Patent [19]

Osada

[11] 4,449,072
[45] May 15, 1984

[54] COMPACT FLUORESCENT LAMP
[75] Inventor: Kimio Osada, Yokosuka, Japan
[73] Assignee: Tokyo Shibaura Denki Kabushiki Kaisha, Kawasaki, Japan
[21] Appl. No.: 272,388
[22] Filed: Jun. 10, 1981
[30] Foreign Application Priority Data

Jul. 11, 1980 [JP] Japan .................................. 55-94723

[51] Int. Cl.³ .............................................. H01J 7/44
[52] U.S. Cl. ..................................... 315/58; 315/71; 313/493; 313/240; 313/318
[58] Field of Search ........................ 315/58, 71, 108; 313/148, 240, 242, 318, 493; 362/363, 396

[56] References Cited

U.S. PATENT DOCUMENTS

| | | | |
|---|---|---|---|
| 3,283,198 | 11/1966 | Bellott et al. | 313/242 X |
| 3,953,761 | 4/1976 | Guidice | 315/71 |
| 4,199,708 | 4/1980 | Lauwerijssen et al. | 313/493 |
| 4,270,071 | 5/1981 | Morton | 315/58 X |
| 4,347,460 | 8/1982 | Latassa et al. | 313/493 X |
| 4,383,200 | 5/1983 | Van Zon et al. | 315/58 X |

FOREIGN PATENT DOCUMENTS

| | | | |
|---|---|---|---|
| 4928295 | 12/1977 | Japan | 313/493 |
| 55-83147 | 6/1980 | Japan | 313/493 |

Primary Examiner—Eugene R. LaRoche
Assistant Examiner—Vincent De Luca
Attorney, Agent, or Firm—Oblon, Fisher, Spivak, McClelland & Maier

[57] ABSTRACT

Disclosed is a compact fluorescent lamp having a chassis member consisting of a cylindrical part and a holder member, a screw base screwed to the cylindrical part, a base member attached to the cylindrical part, a winding envelope formed by bending a straight tube twice into U-shapes, a ballast mounted to the holder member of the chassis member and a globe member attached to the base member.

7 Claims, 4 Drawing Figures

COMPACT FLUORESCENT LAMP

BACKGROUND OF THE INVENTION

1. Field of the Invention

This invention relates generally to a compact fluorescent lamp, and more particularly to such a lamp having a winding envelope and an incandescent lamp base.

2. Description of Prior Art

Fluorescent lamps have been used as a general source of illumination for many years. A fluorescent lamp has high lighting efficiency and a low consumption of electric power in comparison with an incandescent lamp and therefore a compact fluorescent lamp provided on an incandescent lamp base, i.e. an E 26-type screw base, has been developed. But in order to interchange an incandescent lamp with such a compact fluorescent lamp, it is necessary for the fluorescent lamp to have a folded envelope because, in order to obtain about the same brightness as with an incandescent lamp, it is necessary for the fluorescent lamp's envelope to have a certain minimum length. Such a compact fluorescent lamp is known, for example, from U.S. Pat. Nos. 3,953,761 and 4,199,708. Such a fluorescent lamp has a lamp base providing a plurality of screw thread portions, a screw base which is secured to the thread portions of the lamp base, a globe, a partition plate dividing the base side and the globe side, a winding envelope and a ballast provided to the partition plate, in which screw threads are formed on both the lamp base and the screw base itself. However, as the screw base is mounted directly to the lamp base in a conventional lamp, it is necessary for the lamp base to be subjected not only to a torsion moment when attaching to a socket but also to the total weight of the lamp including a heavy ballast, a winding envelope and other equipment attached by way of the partion plate.

Moreover, in such a compact fluorescent lamp, the winding envelope and the ballast are disposed close together and are encased inside the base and the globe. Consequently, the temperature of the winding envelope rises on account of the radiant heat of the ballast and the hot air inside the base and the globe. When the winding envelope reaches a high temperature, the vapor pressure of the mercury sealed in the envelope exceeds the optimum vapor pressure. As a result, the strength of ultraviolet rays emitted in the envelope decreases, so that the lighting efficiency of the fluorescent lamp falls.

SUMMARY OF THE INVENTION

Accordingly, one object of this invention is to provide a novel compact fluorescent lamp in which screw base is directly provided to a chassis member.

Another object of this invention is to provide a novel compact fluorescent lamp which prevents the radiant heat of the ballast from operating on the winding envelope.

Yet another object of this invention is to provide a novel compact fluorescent lamp maintaining a high lighting efficiency even if operating within a high surrounding temperature.

These and other objects have now been achieved according to this invention by providing the new and improved compact fluorescent lamp described below.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENT

Figure 1:
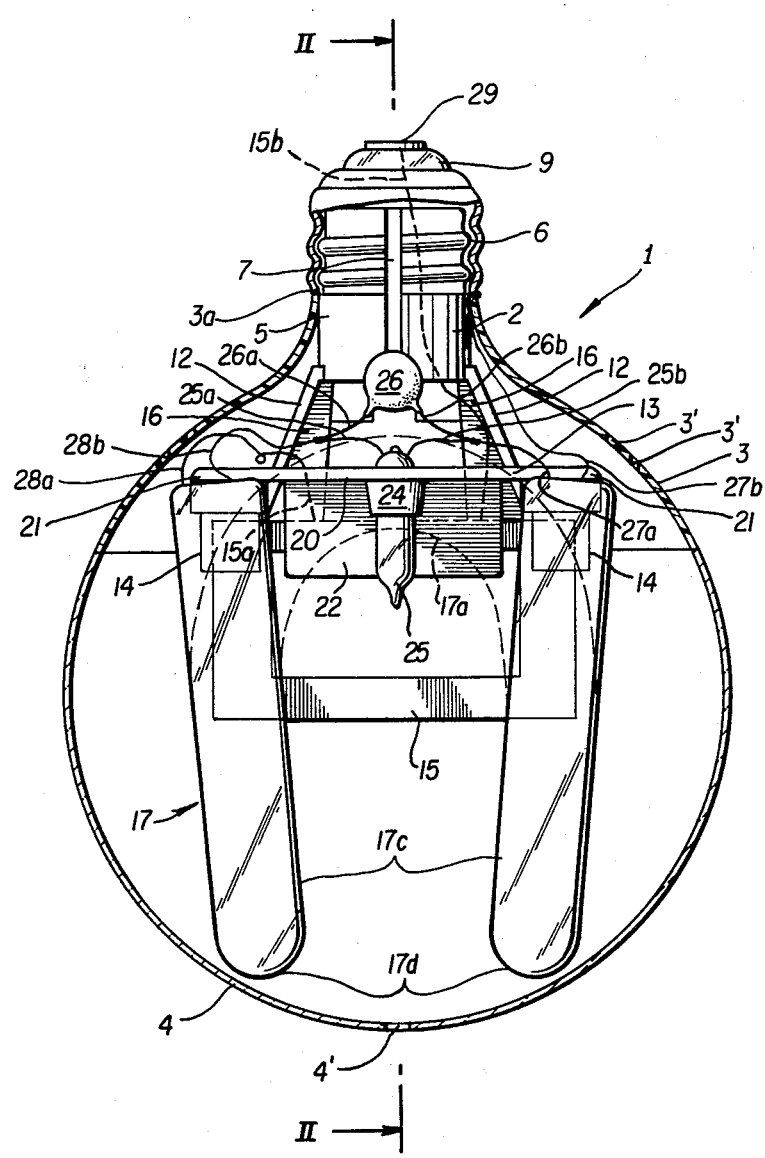
FIG. 1 is a longitudinal cross-sectional view of a compact fluorescent lamp of this invention.
Figure 2:
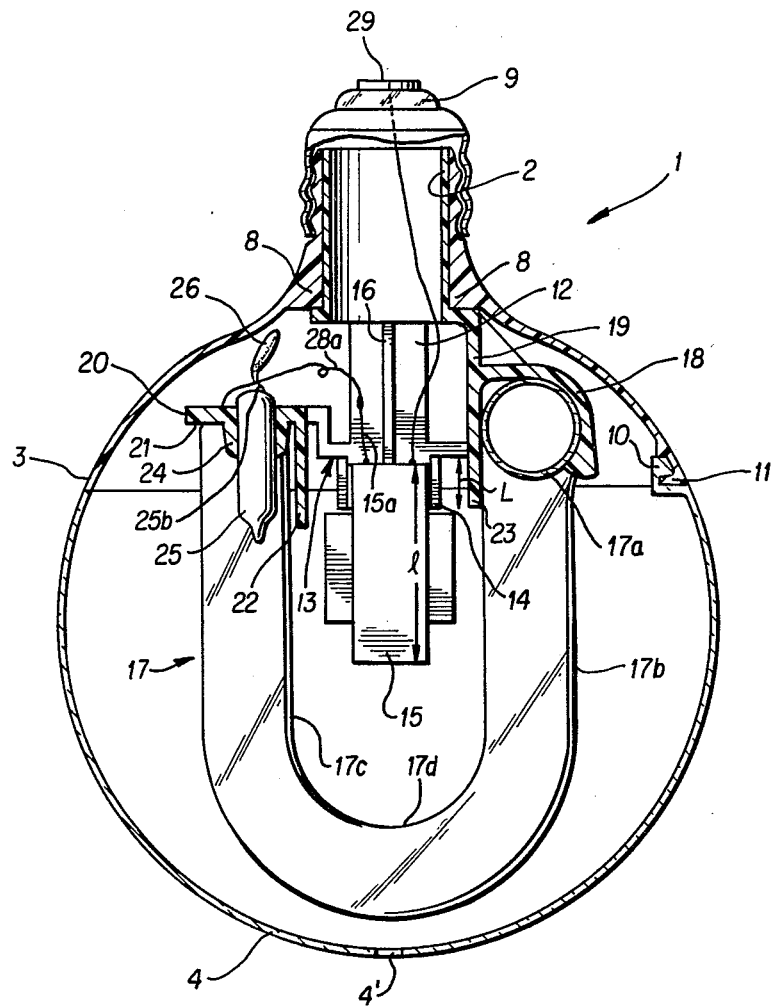
FIG. 2 is a view taken on line II—II of FIG. 1.
Figure 3:
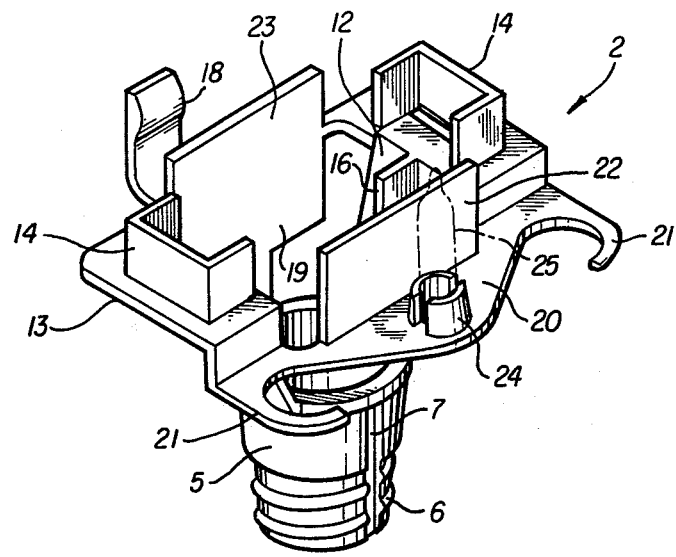
FIG. 3 is a perspective view of a chassis of a compact fluorescent lamp of this invention.
Figure 4:
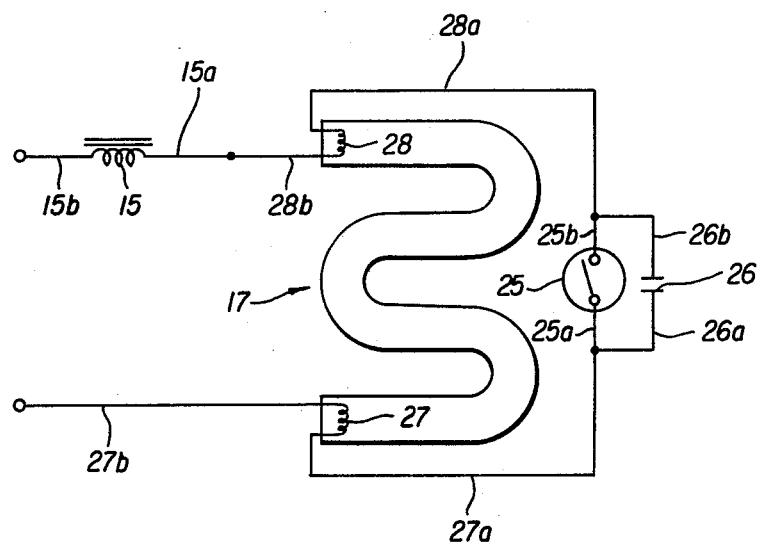
FIG. 4 is a schematic diagram of an electric circuit embodying this invention.

Referring now to the drawing, wherein like reference numerals designate identical or corresponding parts through the several views, and more particularly to FIG. 1 and FIG. 2 thereof, a compact fluorescent lamp 1 having a chassis member 2, a base member 3 and a globe member 4, is shown. The chassis 2 is made of heat proof plastics (i.e. polycarbonate resin) and includes a cylindrical part 5 at one end thereof. The cylindrical part 5 is partially formed as a screw part 6 on the outside thereof. Moreover, the cylindrical part 5 is formed with opposing longitudinal recesses 7 along the outer surface thereof and the top end of each recess 7 is open. The hemisphere shaped base member 3, having an upper opening 3a and a lower opening 3b, is attached to the cylindrical part 5 of the chassis member 2. The inside surface of the upper opening 3a is provided with opposing projection parts 8 and the attachment of the cylindrical part 5 to the base member 3 is accomplished by positioning the projections 8 of the base member 3 in the recesses 7 of the chassis member 2. An incandescent lamp screw base 9 (i.e. E-26 type base) is fixed by screwing to the screw part 6 of the cylindrical part 5. Moreover, the base member 3 is provided with a plurality of arc-shaped openings 3' adjacent the lower peripheral opening 3b. The lower opening 3b of the base member 3 is mounted to the bowl shape globe member 4 which is made of plastics (i.e. polycarbonate) and colored, for example, white. Moreover the globe member 4 has a plurality of openings 4' to flow air near the top thereof. The connection of the base member 3 and the globe member 4 is achieved by cooperating hook portions 11 and 10 provided respectively at the peripheries of the base member 3 and the globe member 4.

On the other hand, two arm parts 12 are formed at one end of the cylindrical part 5 of the chassis member 2. A rectangular holding member 13 is mounted to the top of the arm parts 12. A pair of opposed channel shaped fixing wall members 14 are respectively mounted in the holding member 13 so as to face each other.

Between these fixing wall members 14, the top of a ballast 15 is positioned and is fixed with its lead wires 15a, 15b directed to the base member 3. Further the height (L) of the fixing walls 14, is about from 20 to 25 percent of the height, (l) of the ballast 15. Moreover, a rib 16 is respectively provided in each of the arm parts 12, not only to reinforce the arm parts 12 but also to provide a stop face for the top of the ballast 15. A winding envelope 17 is mounted to the holding member 13 so as to surround the ballast 15. The winding envelope 17 is made by bending a straight glass tube into a U-shape to form a first bent part 17a and a pair of first leg parts 17b, followed by the bending once more of each of the pair of leg parts 17b into second U-shapes to form second leg parts 17c and two pairs of second bent parts 17d. The thus formed winding envelope 17 is of a small and compact shape which may be referred to as a saddle shape envelope.

The holding member 13 of the chassis member 2 also provides a hook arm member 18 by way of a spread plate 19 to hold the first bent part 17a of the winding envelope 17 and a holder plate 20 having parts 21 to hold both ends of the winding envelope 17. The first bent part 17a of the winding envelope 17 is maintained between the hook arm member 18 and the spreader plate 19. The holder plate 20 is formed like a flange having semicircle pieces 21 at both ends thereof and the semicircle pieces 21 hold both ends of the winding envelope 17. Moreover the holder member 13 of the chassis member 2 provides a large heat shield plate 22 mounted to the holder plate 20 and a small heat shield plate 23 mounted to the spreader plate 19. Consequently, the heat from the ballast 15 to the first bent part 17a and both ends of the winding envelope 17 is shielded by the large and small heat shield plates 22 and 23. The holder plate 20 also provides a holder wall 24 for holding a glow starter 25 at the center thereof. The glow starter 25 is held by the holder wall 24 to direct the inserting of the globe member 4. Lead wires 25a and 25b of the glow starter 25 are connected to the lead wires 26a and 26b of a condenser 26 by twisting each of the connected lead wires, and the lead wires 25a and 26a and 25b and 26b are respectively connected by welding to lead wires 27a and 28a of electrodes 27 and 28 mounted to the ends of the winding envelope 17. Other lead wires 27b and 28b are respectively connected to the edge of the screw base 9 and to the lead wire 15a of the ballast 15. The lead wire 15b of the ballast 15 is connected to an outer contact 29 of the screw base 9 by welding.

The inner surface of the winding envelope 17 is coated with phosphorus, and a predetermined amount of mercury and inert gasses are sealed in the winding envelope 17.

In such a fluorescent lamp, the chassis member 2 consists of the cylindrical part 5 to be mounted to the screw base 9, and the holder member 13. Consequently, since the relatively heavy ballast 15 (approximately two thirds of the lamp weight) and the winding envelope 17 are mounted to the holder member 13, the weight of these elements is wholly supported by the chassis member 2 and the base member 3 is not required to support the weight of these elements. Thus, it is not necessary to design the mechanical strength of the base member 3 so strongly as would otherwise be necessary because the mechanical structure of the base member 3 is subjected only to a torsion moment when attaching to a socket.

Moreover, since there exist the heat shield plates 22 and 23 between the ballast 15 and the bent part 17a and the ends of the winding envelope 17, the radiant heat from the ballast 15 is prevented from impinging directly upon the bent part 17a and the ends of the winding envelope 17. The first bent part 17a of the winding envelope 17 in particular is kept at a relatively low temperature (i.e. from 50° to 53° C.). Thus, the mercury vapor pressure within the winding envelope 17 is maintained low because the mercury vapor condenses at the first bent part 17a and the portions near thereto. This condensation of mercury vapor limits the mercury vapor density during the lighting of the winding envelope 17, so that the overall mercury vapor pressure is kept at an optional low value (i.e. 5 to $6 \times 10^3$ mmHg). The lighting efficiency of the fluorescent lamp is thus prevented from decreasing.

Furthermore, the base member 3 and the globe member 4 respectively have openings 3' and 4' so the heated air in the base member 3 and the globe member 4 is circulated through the openings 3' and 4'. Consequently, the winding envelope 17 is cooled by outside air flowing through these openings 3' and 4', so that mercury vapor pressure of the winding envelope 17 may be kept at the optimal value.

Moreover, with regard to the fixing of the ballast 15, the top part thereof is fixed by the fixing wall members 14, and the ratio of the height of the fixing wall members 14 to the height of the ballast 15 is about from 20 to 25 percent. Consequently, the lamp shows good resistance not only to the radiant effect of the ballast but also to external oscillations which might otherwise disturb the ballast.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the Unites States is:

1. A compact fluorescent lamp comprising:
   a screw base;
   a unitary chassis member having a cylindrical part, and a holder member, said screw base secured to said cylinder part;
   a base member, having an upper opening and a lower opening, said base member being attached to said cylindrical part so as to cover said chassis member;
   a winding envelope attached to said holder member and formed by bending a straight glass tube into a U-shape, thereby forming a first bent part and a pair of first leg parts, and bending each of said first leg parts into a second U-shape, thereby forming a pair of second bent parts and two pairs of second leg parts;
   a ballast mounted to said holder member of said chassis member;
   said holder member of said unitary chassis member for substantially supporting the weight of said winding envelope and said ballast, said unitary chassis member further including a hook arm member extending from said holder member for holding said first bent part of said winding envelope, at least a pair of fixing wall members extending from said holder member for fixing said ballast to said holder member and for providing resistance to the radiant effect of the ballast and to external oscillations, at least first and second heat shield plates extending from said holder member and positioned between said ballast and the ends of said winding envelope for preventing the radiant heat of said ballast from impinging upon said winding envelope, and a holder plate extending from said holder member for holding said ends of said winding envelope; and
   a globe member forming a semi-sphere attached to said base member.

2. The compact fluorescent lamp of claim 1, wherein said cylindrical part provides a plurality of screw thread portions.

3. The compact fluorescent lamp of claim 1, wherein said holder plate includes a holder wall for holding a glow starter.

4. The compact fluorescent lamp of claim 1 wherein said globe member has a plurality of openings facing said second bent parts of said winding envelope.

5. The compact fluorescent lamp of claim 1 wherein the shape of said lamp is substantially spherical.

6. A compact fluorescent lamp according to claim 1, wherein:
the height of said fixing walls are in the range from 20 to 25 percent of the height of said ballast.

7. A compact fluorescent lamp according to claim 1, wherein:
said first heat shield is larger than said second heat shield.

* * * * *